United States Patent
Haghighat et al.

(10) Patent No.: US 8,995,554 B2
(45) Date of Patent: Mar. 31, 2015

(54) METHOD AND APPARATUS FOR REDUCING INTERFERENCE IN SPACE FREQUENCY BLOCK CODING COMMUNICATION

(71) Applicant: InterDigital Technology Corporation, Wilmington, DE (US)

(72) Inventors: Afshin Haghighat, Ile-Bizard (CA); Yingxue Li, San Diego, CA (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 14/169,868

(22) Filed: Jan. 31, 2014

(65) Prior Publication Data

US 2014/0146912 A1 May 29, 2014

Related U.S. Application Data

(63) Continuation of application No. 13/532,267, filed on Jun. 25, 2012, now Pat. No. 8,670,498, which is a continuation of application No. 12/117,373, filed on May 8, 2008, now Pat. No. 8,208,574.

(60) Provisional application No. 60/916,741, filed on May 8, 2007.

(51) Int. Cl.
*H04B 7/02* (2006.01)
*H04L 27/28* (2006.01)
(Continued)

(52) U.S. Cl.
CPC .............. *H04L 27/28* (2013.01); *H04L 1/0606* (2013.01); *H04B 1/38* (2013.01); *H04L 5/0023* (2013.01)
USPC ........... 375/267; 375/260; 375/259; 375/347; 375/299; 375/295; 375/316

(58) Field of Classification Search
USPC .......... 375/267, 260, 259, 347, 299, 295, 316
See application file for complete search history.

(56) References Cited

U.S. PATENT DOCUMENTS

| | | |
|---|---|---|
| 5,111,534 A | 5/1992 | Benner |
| 7,400,687 B2 | 7/2008 | Matsumoto et al. |

(Continued)

FOREIGN PATENT DOCUMENTS

| | | |
|---|---|---|
| WO | 02/101962 | 12/2002 |
| WO | 2006/113008 | 10/2006 |

OTHER PUBLICATIONS

Rahman et al., "Combining Orthogonal Space-Frequency Block Coding and Spatial Multiplexing in MIMO-OFDM System," International OFDM Workshop (Aug. 31, 2005).

*Primary Examiner* — Zewdu Kassa
(74) *Attorney, Agent, or Firm* — Volpe and Koenig, P.C.

(57) ABSTRACT

A method and apparatus of reducing interference in space frequency block coding (SFBC) communication are disclosed. SFBC encoding is performed on at least one pair of symbols. The symbols are assigned to subcarriers in accordance with a frequency assignment pattern assigned to a cell. Different frequency assignment patterns are assigned to neighboring cells. Cells in the network may be divided into a plurality of groups and a different frequency assignment pattern may be assigned to each group of cells. The frequency assignment pattern may be defined such that subcarriers mapped to a pair of symbols in one cell are interlaced to subcarriers mapped to a pair of symbols in a neighbor cell. Alternatively, the frequency assignment pattern may be defined such that subcarriers mapped to a pair of symbols in one cell are shifted in a neighbor cell.

14 Claims, 5 Drawing Sheets

(51) Int. Cl.
  *H04L 1/06* (2006.01)
  *H04B 1/38* (2006.01)
  *H04L 5/00* (2006.01)

(56) References Cited

U.S. PATENT DOCUMENTS

| | | | |
|---|---|---|---|
| 7,633,900 B2 | 12/2009 | Hwang et al. | |
| 7,729,310 B2 | 6/2010 | Kim | |
| 7,764,662 B2 | 7/2010 | Oh et al. | |
| 2005/0037763 A1 | 2/2005 | Hamamoto et al. | |
| 2005/0058212 A1* | 3/2005 | Shao | 375/260 |
| 2005/0281350 A1 | 12/2005 | Chae et al. | |
| 2006/0078066 A1 | 4/2006 | Yun et al. | |
| 2006/0133530 A1 | 6/2006 | Kwak et al. | |
| 2007/0153925 A1 | 7/2007 | Yang | |
| 2007/0259635 A1* | 11/2007 | Oh et al. | 455/186.1 |
| 2008/0279263 A1 | 11/2008 | Haghighat | |
| 2009/0003466 A1 | 1/2009 | Taherzadehboroujeni et al. | |
| 2010/0296459 A1 | 11/2010 | Miki et al. | |

* cited by examiner

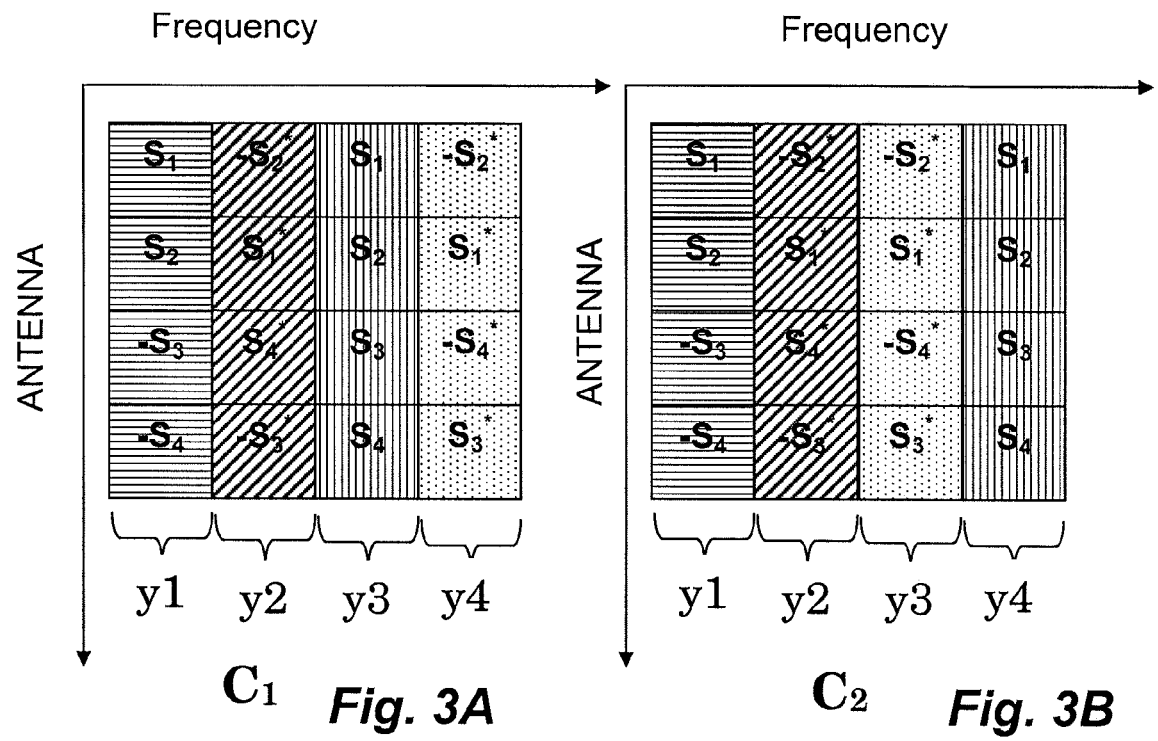
Fig. 3A  Fig. 3B
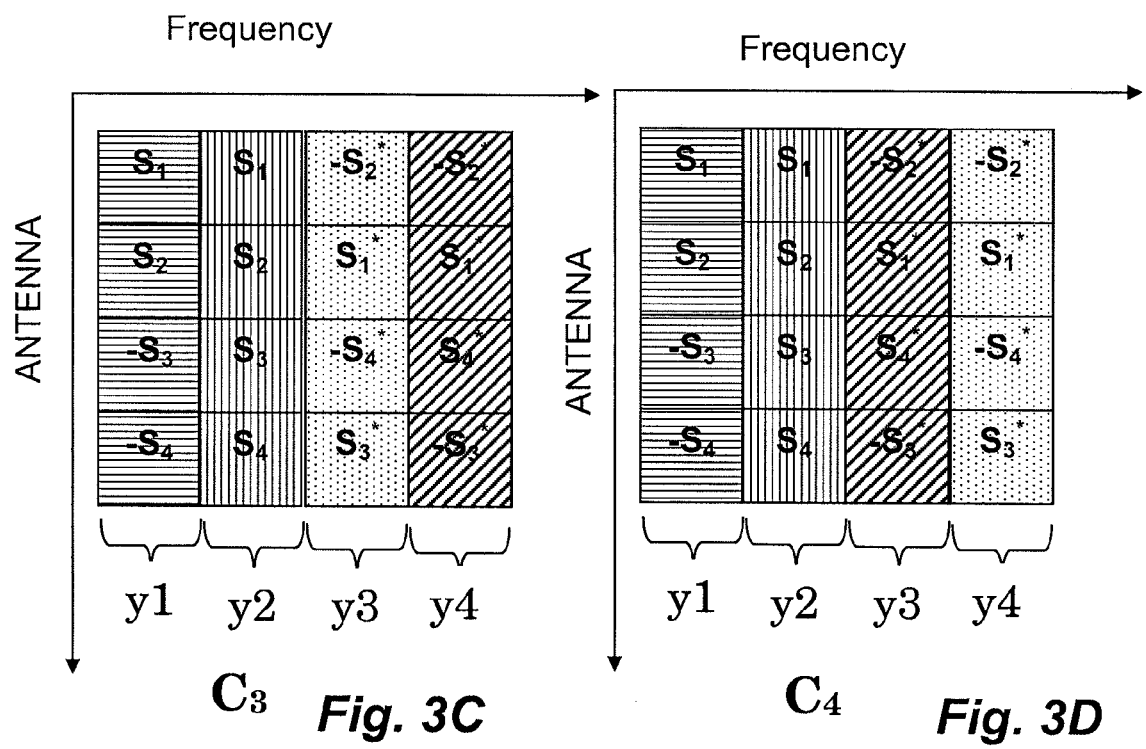
Fig. 3C  Fig. 3D

METHOD AND APPARATUS FOR REDUCING INTERFERENCE IN SPACE FREQUENCY BLOCK CODING COMMUNICATION

CROSS REFERENCE TO RELATED APPLICATION

This application is a continuation of U.S. patent application Ser. No. 13/532,267, filed Jun. 25, 2012, which is a continuation of U.S. patent application Ser. No. 12/117,373, filed May 8, 2008, now U.S. Pat. No. 8,208,574, which issued on Jun. 26, 2012, which claims priority from U.S. Provisional Application No. 60/916,741 filed on May 8, 2007, the contents of all of which are hereby incorporated by reference as if fully set forth herein.

FIELD OF INVENTION

The present invention is related to wireless communications.

BACKGROUND

Alamouti-type space frequency block coding (SFBC) has been accepted as a diversity scheme in the third generation partnership project (3GPP) long term evolution (LTE) for two transmit antenna devices due to its excellent performance and simple decoding. SFBC may be extended to four transmit antenna devices by combining SFBC with frequency switch transmit diversity (FSTD).

Alamouti scheme of space time codes (STC) involves transmission of multiple redundant copies of data. In SFBC, the data stream to be transmitted is encoded in blocks and distributed among spaced antennas and across multiple subcarriers. While it is necessary to have multiple transmit antennas, it is not necessary to have multiple receive antennas, although to do so improves performance.

Although SFBC and its variants such as SFBC/FSTD achieve good performance in interference free environment, it imposes undesirable structure to intercell interference (ICI). In a conventional two-transmit antenna system, a first Node B transmits SFBC encoded data to a first user equipment (UE). In the meantime, a neighboring Node B (a second Node B) transmits SFBC encoded data to a second UE over the same frequency band. The transmission from the second Node B to the second UE works as an interference to the first UE.

The SFBC encoder in the first Node B encodes two incoming data signal s1 and s2 according to well known Alamouti scheme as follows:

$$S = \begin{pmatrix} s_1 & -s_2^* \\ s_2 & s_1^* \end{pmatrix};$$ Equation (1)

where a row index is a spatial index and a column index is a frequency index.

Likewise, the SFBC-encoded data from the second Node B, which works as an interference to the first UE, can be expressed as follows:

$$I = \begin{pmatrix} i_1 & -i_2^* \\ i_2 & i_1^* \end{pmatrix}.$$ Equation (2)

Assuming channel responses are equal for two adjacent frequency subcarriers, and a channel coefficient matrix H associated with the first UE and a channel coefficient matrix G associated with the second UE are as follows:

$$H = (h_1\ h_2);$$ Equation (3)

and $$G = (g_1\ g_2).$$ Equation (4)

It is assumed that a single receive antenna is used at the UE in the equations above. However, it can be extended to multiple antennas. The received signal at two subcarriers at the first UE can be written as follows:

$$\begin{pmatrix} y_1 \\ y_2^* \end{pmatrix} = \begin{pmatrix} h_1 & h_2 \\ h_2^* & -h_1^* \end{pmatrix}\begin{pmatrix} s_1 \\ s_2 \end{pmatrix} + \begin{pmatrix} g_1 & g_2 \\ g_2^* & -g_1^* \end{pmatrix}\begin{pmatrix} i_1 \\ i_2 \end{pmatrix} + \begin{pmatrix} n_1 \\ n_2 \end{pmatrix}.$$ Equation (5)

The second term in Equation (5) is interference term. The interference caused by i1 is spanned by $(g_1\ g_2)$, and interference caused by i2 is spanned by $(g_2^*\ -g_1^*)$. Since $(g_1\ g_2)$ and $(g_2^*\ -g_1^*)$ are orthogonal, the interference can not be cancelled.

SUMMARY

A method and apparatus of reducing interference in space frequency block coding (SFBC) communication are disclosed. SFBC encoding is performed on at least one pair of symbols. The symbols are assigned to subcarriers in accordance with a frequency assignment pattern assigned to a cell. Different frequency assignment patterns are assigned to neighboring cells. Cells in the network may be divided into a plurality of groups and a different frequency assignment pattern may be assigned to each group of cells. The frequency assignment pattern may be defined such that subcarriers mapped to a pair of symbols in one cell are interlaced to subcarriers mapped to a pair of symbols in a neighbor cell. Alternatively, the frequency assignment pattern may be defined such that subcarriers mapped to a pair of symbols in one cell are shifted in a neighbor cell.

BRIEF DESCRIPTION OF THE DRAWINGS

A more detailed understanding of the invention may be had from the following description of a preferred embodiment, given by way of example and to be understood in conjunction with the accompanying drawings wherein:

FIGS. 3A through 3F show examples frequency assignment pattern for 4-transmit antenna scheme.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "Node B" includes but is not limited to a base station, a site controller, an access point (AP), or any other type of interfacing device capable of operating in a wireless environment.

In order to destroy the orthogonality of interference and randomize the interference, different frequency assignment patterns are assigned to neighboring cells and SFBC encoding is performed in accordance with a frequency assignment pattern assigned to a cell. For example, cells in the network are divided into a plurality of groups and each group is assigned to a different frequency assignment pattern for SFBC encoding. Instead of using the same subcarrier mapping pattern, each group of cells use a different frequency assignment pattern. Using this scheme, neighboring cells use the different subcarrier assignment pattern.

Figure 1:
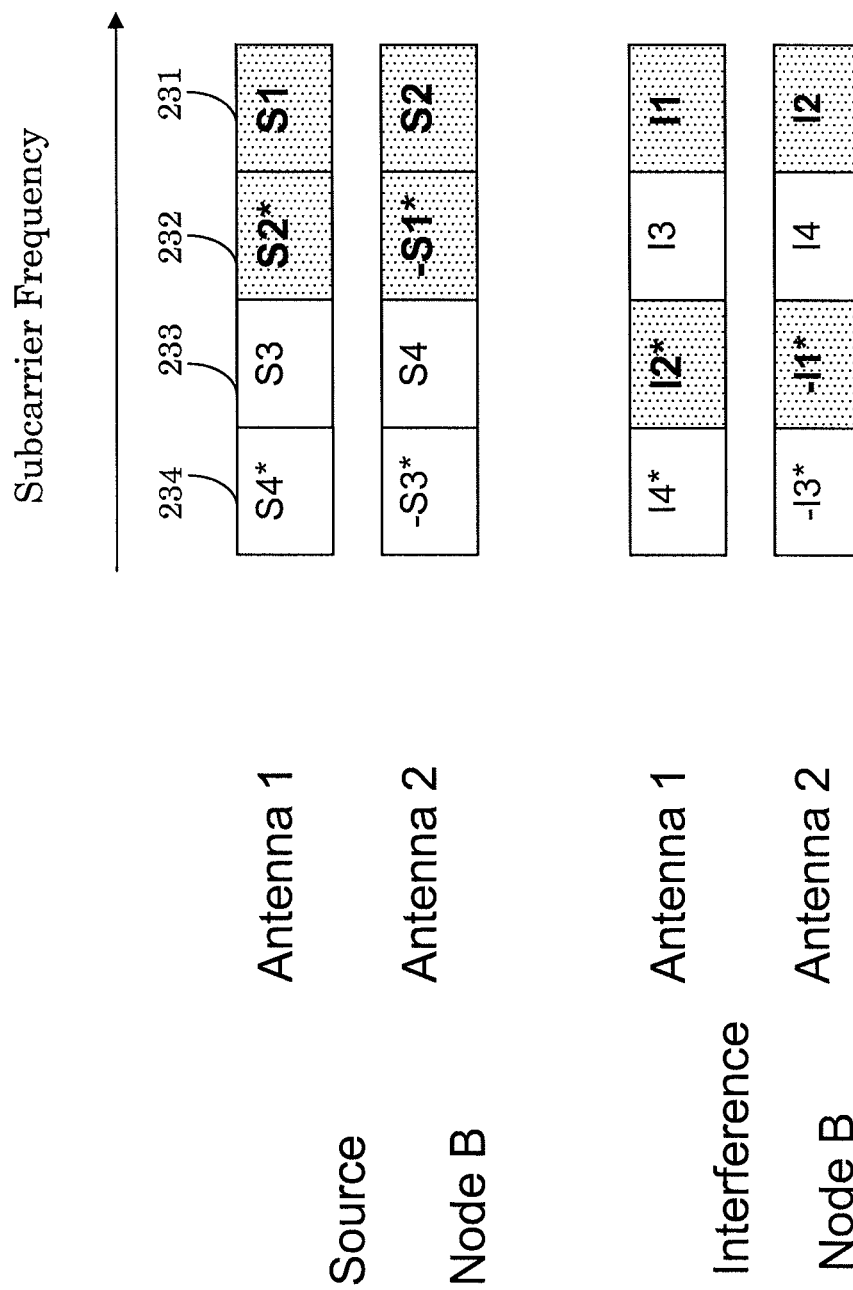
FIG. 1 shows an example of interference randomization scheme using interlacing.

Subcarrier assignment patterns of neighboring cells may be interlaced with each other so that subcarriers mapped to a pair of symbols in one cell are interlaced to subcarriers mapped to a pair of symbols in a neighbor cell. FIG. 1 shows an example of interference randomization scheme using frequency interlacing. A source Node B sends symbols S1-S4 through two transmit antennas. A pair of symbols S1 and S2 is mapped to subcarriers 231 and 232 and another pair of symbols S3 and S4 is mapped to subcarriers 233 and 234 for SFBC encoding. An interference Node B also sends symbols I1-I4 through two transmit antennas. A pair of symbols I1 and I2 is mapped to subcarriers 231 and 233 and another pair of symbols is mapped to subcarriers 232 and 234 for SFBC encoding. The subcarriers mapped for the two pairs of symbols at the source Node B and the interference Node B are interlaced as shown in FIG. 1.

The received symbols at a WTRU may be expressed as follows:

$$\begin{pmatrix} y_1 \\ y_2^* \end{pmatrix} = \begin{pmatrix} h_1 & h_2 \\ h_2^* & -h_1^* \end{pmatrix} \begin{pmatrix} s_1 \\ s_2 \end{pmatrix} + \begin{pmatrix} g_1 & g_2 \\ \alpha g_2^* & -\beta g_1^* \end{pmatrix} \begin{pmatrix} i_1 \\ i_2 \end{pmatrix} + \begin{pmatrix} n_1 \\ n_2 \end{pmatrix};\quad \text{Equation (6)}$$

where $\alpha = i^*_4/i^*_1$, and $\beta = -i^*_3/i^*_2$. Both $\alpha$ and $\beta$ are random variables determined by signal constellation. Due to the existence of these two variables, the orthogonality of interference no longer exists and the residue interference after SFBC decoding becomes more random.

Figure 2:
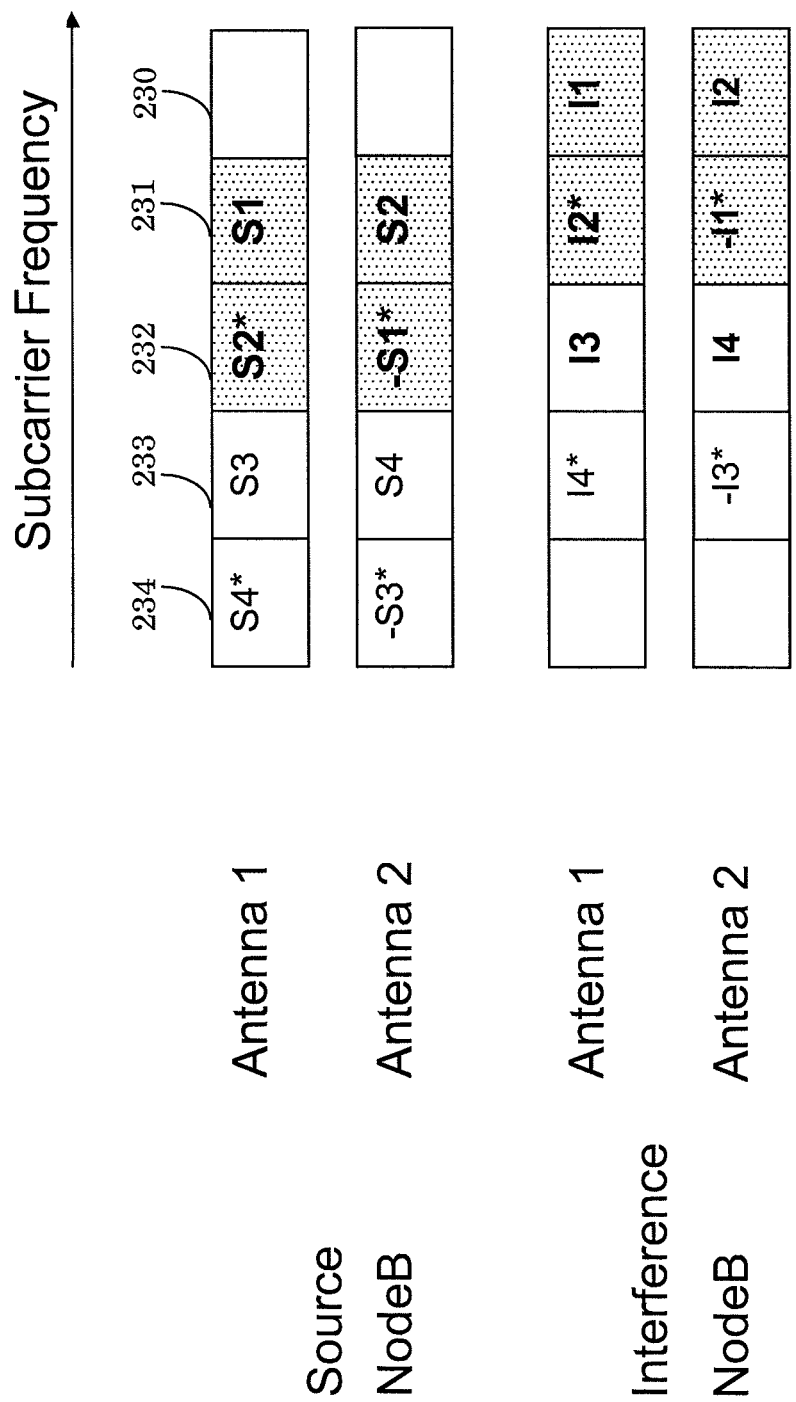
FIG. 2 shows an example of interference randomization scheme using frequency shifting.

Alternatively, the subcarrier assignment patterns may be frequency shifted so that subcarriers mapped to a pair of symbols in one cell is shifted in a neighbor cell. FIG. 2 shows an example of interference randomization scheme using frequency shifting. A source Node B sends symbols S1-S4 through two transmit antennas. A pair of symbols S1 and S2 is mapped to subcarriers 231 and 232 and another pair of symbols S3 and S4 is mapped to subcarriers 233 and 234 for SFBC encoding. An interference Node B also sends symbols I1-I4 through two transmit antennas. A pair of symbols I1 and I2 is mapped to subcarriers 230 and 231 and another pair of symbols is mapped to subcarriers 232 and 233 for SFBC encoding. The subcarriers mapped for the two pairs of symbols at the source Node B and the interference Node B are frequency shifted as shown in FIG. 2 so that the orthogonality of interference no longer exists and the residue interference after SFBC decoding becomes more random.

Figures 3E, 3F:
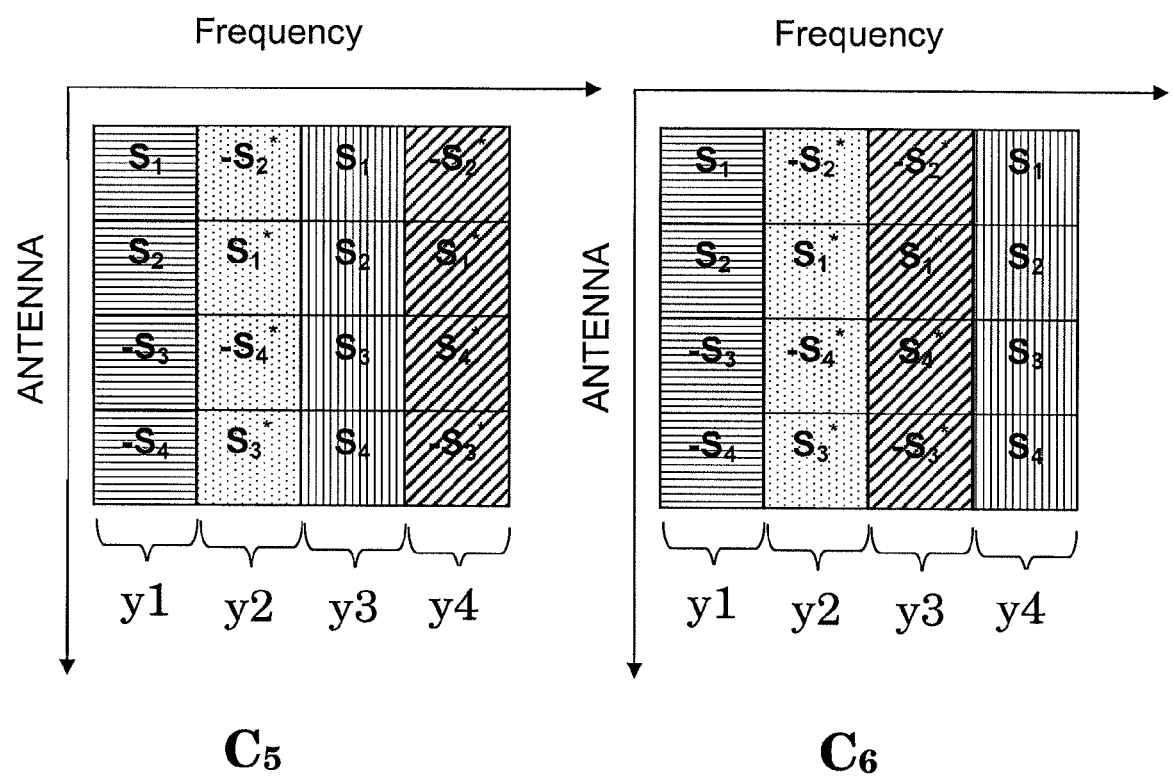

The above 2-transmit antenna scheme may be extended to a 4-transmit antenna case. At a Node B, the SFBC encoding is performed, for example, as shown in FIG. 3A. At a WTRU, the following preprocessing is performed first before SFBC decoding to combine same symbols on different subcarriers in accordance with a frequency assignment pattern used by the Node B:

$$\begin{cases} z_1 = (y_1 + y_3)/2 = h_1 s_1 + h_2 s_2 + g_1 i_1 + g_2 i_2 + n_1 \\ z_2 = (y_2 + y_4)/2 = -h_1 s_2^* + h_2 s_1^* - g_1 i_2^* + g_2 i_1^* + n_2 \\ z_3 = (y_3 - y_1)/2 = h_3^* s_3 + h_4 s_4 + g_3^* i_3 + g_4 i_4 + n_3 \\ z_4 = (y_4 - y_2)/2 = -h_3^* s_4^* + h_4 s_3^* - g_3^* i_4^* + g_4 i_3^* + n_4. \end{cases} \quad \text{Equation (7)}$$

z1 and z2 signals are fed to a first SFBC decoder to obtain s1 and s2 estimation, and z3 and z4 signals are fed to a second SFBC decoder to obtain s3 and s4 estimation. In other words, the SFBC-FSTD decoding is decomposed into two parallel SFBC decoding. Input to each SFBC decoder has the same signal and interference structure as in the 2-transmit antenna system. In the 4-transmit antenna system, neighboring cells use different frequency assignment patters defined by interlacing and/or frequency shifting as stated above in order to randomize the interference.

In the 4-transmit antenna system, for a given configuration, (for example, 4 transmit antennas, 4 subcarriers, and code-rate=1), there are 4!=24 different configurations for the y-to-z transformations that will not result in an orthogonal form for detection of the symbols. Six example configurations are shown in FIGS. 3A to 3F.

Since the preprocessing has different effect to desired signal and interference, the results of preprocessing have randomized interference structure, and better performance may be achieved under certain circumstances.

Figure 4:
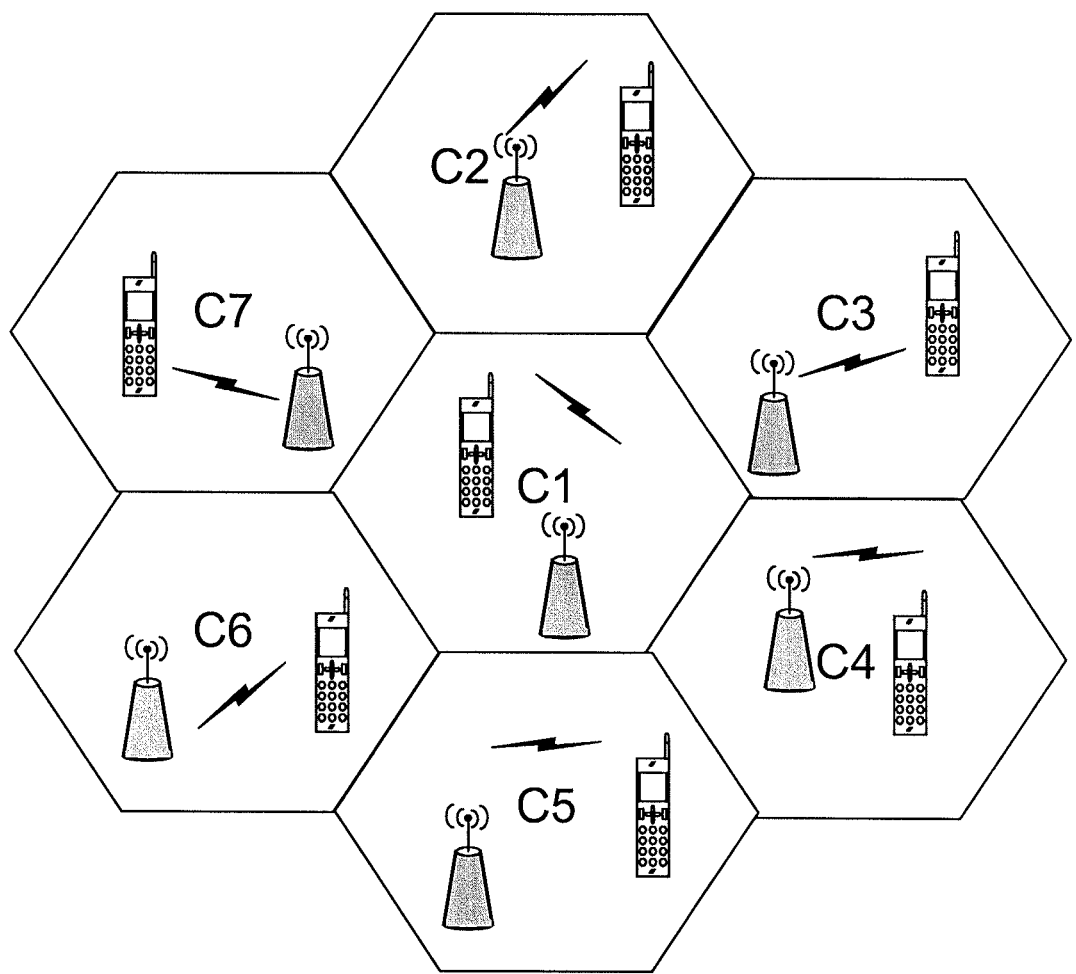
FIG. 4 shows an example of cell partition.

The network may be divided into a plurality of groups, and each group may be assigned to a different frequency assignment pattern. FIG. 4 shows example network cell grouping with a frequency assignment pattern reuse factor of 7. In FIG. 4, each of the seven cells uses a different frequency assignment pattern. The frequency assignment pattern may be signaled through higher layer signaling to each cell.

In this deployment example, interfering cells that are using the frequency assignment pattern of C2 through C7 will not have an orthogonal interference structure while the inner cell uses a frequency assignment pattern of C1 to detect its own symbols.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method of reducing inter-cell interference in space frequency block coding (SFBC) communication, the method comprising
performing SFBC encoding on n sets of n symbols, wherein the SFBC encoding includes mapping the n sets of n symbols across a set of n subcarriers and across a set of n antennas according to a first frequency assignment pattern in a serving cell, wherein n is an integer greater than 1, and wherein a set of n symbols, selected from the n sets of n symbols, includes a version of each symbol of the set of n symbols, and wherein a version of a symbol includes a redundant version of the symbol, a conjugate version of the symbol, an inverted version of the symbol, and an inverted conjugate version of the symbol;
transmitting the n sets of n symbols using the first frequency assignment pattern over the set of n antennas;
wherein the first frequency assignment pattern maps symbols to the set of n subcarriers and the set of n antennas, wherein each set of the n sets of n symbols is orthogonal to each of the other sets of n symbols, and wherein a subset of the n sets of n symbols is mapped to the same subcarriers as the subset of the n sets of n symbols in a neighbor cell and the remaining sets of n symbols are mapped to a cyclically shifted version of the remaining subcarriers as the remaining sets of n symbols are mapped to the remaining subcarriers in the neighbor cell.

2. The method of claim 1, wherein n is four.

3. The method of claim 2, wherein the subset of the four sets of four symbols comprises one set of four symbols, such that the remaining sets of four symbols comprises three sets of four symbols.

4. The method of claim 2, wherein the subset of the four sets of four symbols comprises two sets of four symbols, such that the remaining sets of four symbols comprises two sets of four symbols.

5. A method of receiving randomized interference in space frequency block coding (SFBC) communication, the method comprising:
receiving a transmission from a serving cell including n sets of n SFBC-encoded symbols mapped to a set of n subcarriers in accordance with a first frequency assignment pattern, wherein each set of the n sets of n SFBC-encoded symbols is received via a respectively mapped subcarrier of the set of n subcarriers, and wherein a first subset of the n sets of n SFBC-encoded symbols is received via a respectively mapped first subset of subcarriers of the set of n subcarriers and the remaining sets of n SFBC-encoded symbols are received via the remaining respectively mapped subcarriers of the set of n subcarriers;
receiving a transmission from a neighboring cell including randomized interference from n sets of n SFBC-encoded interfering symbols, wherein a corresponding subset of the n sets of n SFBC-encoded interfering symbols is received via the first subset of subcarriers, and the remaining sets of n SFBC-encoded interfering symbols are received via a cyclically shifted version of the remaining respectively mapped subcarriers of the set of n subcarriers;
preprocessing the received n sets of n SFBC-encoded symbols to combine same symbols on different subcarriers in accordance with the first frequency assignment pattern; and
performing SFBC decoding on the received n sets of n SFBC-encoded symbols to extract the n SFBC encoded symbols.

6. The method of claim 5, wherein a set of n SFBC-encoded symbols includes of a version of each symbol of the set of n SFBC-encoded symbols, and wherein a version of a symbol includes a redundant version of the symbol, a conjugate version of the symbol, an inverted version of the symbol, and an inverted conjugate version of the symbol.

7. The method of claim 6, wherein n is four.

8. The method of claim 7, wherein the subset of the four sets of four SFBC-encoded symbols comprises one set of four SFBC-encoded symbols, such that the remaining sets of four SFBC-encoded symbols comprises three sets of four SFBC-encoded symbols.

9. The method of claim 7, wherein the subset of the four sets of four SFBC-encoded symbols comprises two sets of four SFBC-encoded symbols, such that the remaining sets of four SFBC-encoded symbols comprises two sets of four SFBC-encoded symbols.

10. A wireless transmit/receive unit (WTRU) configured for space frequency block coding (SFBC) communication, the WTRU comprising:
a receiver configured to:
receive a transmission from a serving cell including n sets of n SFBC-encoded symbols mapped to a set of n subcarriers in accordance with a first frequency assignment pattern, wherein each set of the n sets of n SFBC-encoded symbols is received via a respectively mapped subcarrier of the set of n subcarriers, and wherein a first subset of the n sets of n SFBC-encoded symbols is received via a respectively mapped first subset of subcarriers of the set of n subcarriers and the remaining sets of n SFBC-encoded symbols are received via the remaining respectively mapped subcarriers of the set of n subcarriers; and
receive a transmission from a neighboring cell including randomized interference from n sets of n SFBC-encoded interfering symbols, wherein a corresponding subset of the n sets of n SFBC-encoded interfering symbols is received via the first subset of subcarriers, and the remaining sets of n SFBC-encoded interfering symbols are received via a cyclically shifted version of the remaining respectively mapped subcarriers of the set of n subcarriers;
a preprocessor configured to preprocess the received n sets of n SFBC-encoded symbols to combine same symbols on different subcarriers in accordance with the first frequency assignment pattern; and
an SFBC decoder configured to perform SFBC decoding on the received n sets of n SFBC-encoded symbols to extract the n SFBC encoded symbols.

11. The WTRU of claim 10, wherein a set of n SFBC-encoded symbols includes of a version of each symbol of the set of n SFBC-encoded symbols, and wherein a version of a symbol includes a redundant version of the symbol, a conjugate version of the symbol, an inverted version of the symbol, and an inverted conjugate version of the symbol.

12. The WTRU of claim 11, wherein n is four.

13. The WTRU of claim 12, wherein the subset of the four sets of four SFBC-encoded symbols comprises one set of four symbols, such that the remaining sets of four SFBC-encoded symbols comprises three sets of four SFBC-encoded symbols.

14. The WTRU of claim 12, wherein the subset of the four sets of four SFBC-encoded symbols comprises two sets of four SFBC-encoded symbols, such that the remaining sets of four SFBC-encoded symbols comprises two sets of four SFBC-encoded symbols.

* * * * *